United States Patent [19]

Hawthorn et al.

[11] Patent Number: 5,380,038

[45] Date of Patent: Jan. 10, 1995

[54] OFFSET INFLATABLE RESTRAINT SYSTEM

[75] Inventors: Laura A. Hawthorn, Vandalia; Michael W. Donegan, Bellbrook, both of Ohio

[73] Assignee: General Motors Corporation, Detroit, Mich.

[21] Appl. No.: 143,891

[22] Filed: Nov. 1, 1993

[51] Int. Cl.6 .............................................. B60R 21/22
[52] U.S. Cl. ........................ 280/730 R; 280/743 A
[58] Field of Search .......... 280/743 A, 730 R, 743 R, 280/732, 728 R, 742, 740, 729

[56] References Cited

U.S. PATENT DOCUMENTS

| | | | |
|---|---|---|---|
| 4,262,931 | 4/1981 | Strasser et al. | 280/729 |
| 4,265,468 | 5/1981 | Suszko et al. | 280/729 |
| 4,351,544 | 9/1982 | Ross | 280/743 R |
| 4,830,401 | 5/1989 | Honda | 280/743 A |
| 5,090,729 | 2/1992 | Watanabe | 280/730 R |
| 5,129,675 | 7/1992 | Wang | 280/743 R |
| 5,275,435 | 1/1994 | Fischer | 280/730 R |

Primary Examiner—Eric D. Culbreth
Assistant Examiner—Peter C. English
Attorney, Agent, or Firm—Charles E. Leahy

[57] ABSTRACT

According to the invention, a vehicle body has a passenger seating position and an inflatable restraint system for restraining a passenger. The inflatable restraint system includes an inflatable restraint module mounted to the vehicle body. The module includes a module opening through which an inflatable restraint cushion is deployed. The module includes an inflator for discharging gas out through the module opening to inflate the cushion. The cushion includes a forward wall and a rearward wall. The longitudinal centerline of the module opening is offset in a lateral offset direction, such as inboard or outboard, from the longitudinal centerline of the passenger seating position so that initial cushion inflation occurs offset of the centerline of the passenger seating position. A first tether device extends diagonally from the forward wall towards the lateral offset direction to the rearward wall. The first tether device provides a lateral force to laterally steer further cushion inflation in the direction opposite the lateral offset direction and in front of the passenger.

13 Claims, 2 Drawing Sheets

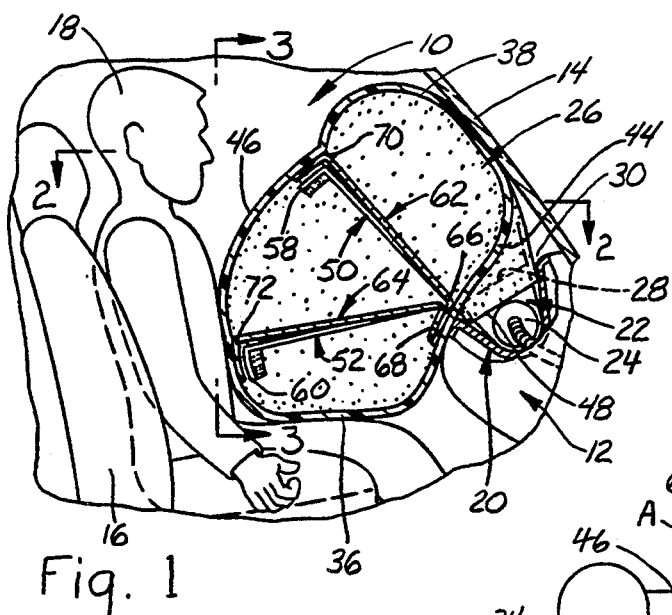
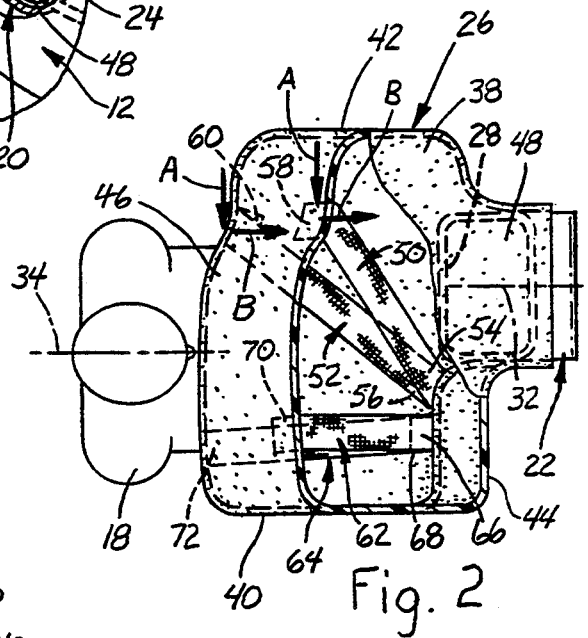
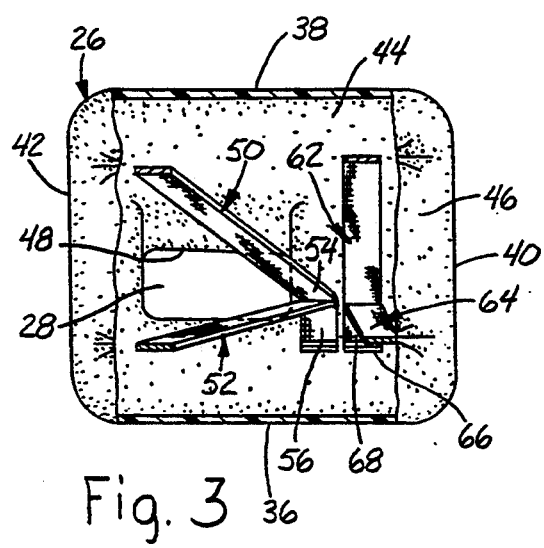
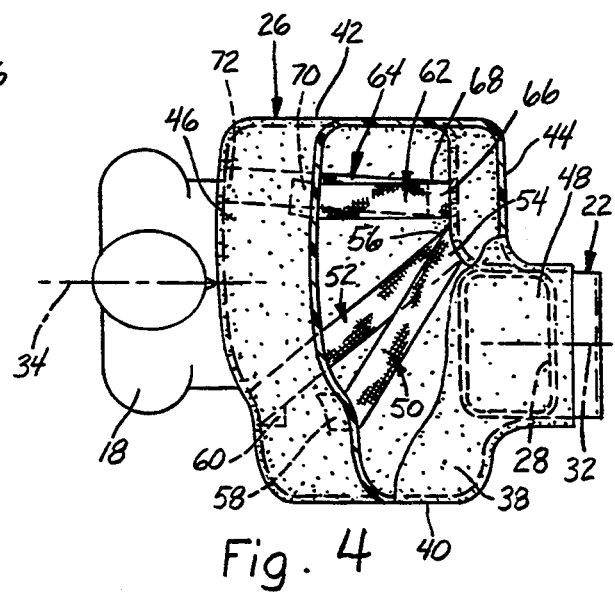

OFFSET INFLATABLE RESTRAINT SYSTEM

This invention relates to an inflatable restraint system in a vehicle, and more particularly to an improved inflatable restraint system having an inflatable restraint module which is laterally offset from a passenger seating position and having an inflatable restraint cushion with tethers for laterally steering the cushion in front of the passenger seating position.

BACKGROUND

It is well known in motor vehicles to provide an inflatable restraint system for restraining a front right-side passenger seated in an outboard front right-side passenger seating position. Typically, the inflatable restraint module is mounted to the vehicle body beneath an opening in the instrument panel substantially in front of the right-side passenger. The inflatable restraint module houses an inflator and an inflatable occupant restraint cushion which is normally stored in a folded condition. The module includes a module opening which is aligned subjacent the panel opening. Upon the vehicle experiencing a predetermined rate of deceleration, the inflator is actuated for generating gas out through the module opening to inflate the cushion for deployment through the module opening in front of the passenger.

It is also well known to provide tethers secured inside the cushion which are straight or have widened ends adjacent a rearward wall of the cushion. These tethers are designed to provide a forward force which pulls the rearward wall of the cushion forwardly to shape the cushion for passenger loading.

The prior art also discloses inflatable restraint systems which provide restraint for both a right-side passenger seated behind a module and a center passenger seated inboard of the module. In these cases, initial cushion inflation occurs in front of the right-side passenger. Additionally, the prior art teaches the use of baffles and diffusers to direct inflating gas in the inboard direction for inflating the cushion towards the center passenger. The prior art also reveals a laterally widened cushion which initially inflates in front of the right-side passenger and has a side portion that is eventually inflated in front of the center passenger.

In some vehicles, it may be desirable to mount the module beneath an opening in the instrument panel which is not substantially in front of the right-side passenger to permit flexibility in packaging of the module within the instrument panel, while still providing restraint for the right-side passenger. It would also be desirable to accomplish this without the use of baffles and diffusers to redirect inflator gas towards the right-side passenger.

Thus, it would be desirable to provide a new and improved inflatable restraint system which allows a conventional module and inflator to be mounted laterally offset from the centerline of the right-side passenger seating position so that initial cushion inflation occurs laterally offset of the right-side passenger seating position, yet which provides restraint for the right-side passenger.

SUMMARY

According to the invention, a vehicle body has a passenger seating position and an inflatable restraint system for restraining the passenger. The inflatable restraint system includes an inflatable restraint module mounted to the vehicle body. The module includes a module opening through which an inflatable restraint cushion is deployed. The module further includes an inflator for discharging gas out through the module opening to inflate the cushion. The cushion includes a forward wall and a rearward wall. The longitudinal centerline of the module opening is offset in a lateral offset direction, such as inboard or outboard, from the longitudinal centerline of the passenger seating position so that initial cushion inflation occurs offset of the centerline of the passenger seating position. A first tether device extends diagonally from the forward wall towards the lateral offset direction to the rearward wall. The first tether device provides a lateral force to laterally steer further cushion inflation in the direction opposite the lateral offset direction and provides a forward force to limit cushion inflation offset of the centerline of the passenger seating position and to define the spacing between the forward and rearward walls of the cushion. A second tether device extends between the forward wall and the rearward wall of the cushion and is laterally spaced apart from the module opening in the direction opposite the lateral offset direction. The second tether device further defines the spacing between the forward and rearward walls of the cushion. Upon deployment of the cushion from the module, the first and second tether devices cooperatively position and shape the cushion for providing restraint to a passenger seated in the passenger seating position.

The first tether device preferably has a length which limits expansion of the rearward wall of the cushion relative the module opening to a predetermined distance which is less than that permitted by the second tether device so that the first tether device becomes fully extended and laterally steers the inflating cushion prior to the second tether device becoming fully extended.

The cushion preferably has an asymmetric shape such that the inflated cushion extends laterally further in the direction opposite the lateral offset direction than in the lateral offset direction relative the longitudinal centerline of the module opening.

Accordingly, it is an object, feature and advantage of this invention to provide an improved inflatable restraint system in which the module opening is laterally offset so that initial cushion inflation occurs offset of the centerline of the passenger seating position and in which the diagonally extending first tether device provides a lateral force which laterally steers the inflating cushion in front of the passenger and in which the first and second tether devices provide forward forces to cooperatively position and shape the cushion for restraining the passenger.

It is a further object to provide an inflatable restraint system having a module opening offset from the centerline of the passenger seating position in which the module and inflator may be of a conventional design since the inboard tethers laterally steer the cushion and eliminate the need for baffles or diffusers to redirect inflator gas in the lateral direction.

Yet another object of this invention, is to provide an inflatable restraint system which allows flexibility in packaging of the module within the instrument panel.

BRIEF DESCRIPTION OF THE DRAWINGS

These and other features, objects and advantages of the present invention will become apparent upon consideration of the following description, appended claims, and accompanying drawings in which:

FIG. 1 is a side view of a vehicle interior showing a right-side passenger seated in a right-side passenger seating position and showing a cross-sectional view of a fully-inflated restraint cushion and a partially-broken-away view of a vehicle instrument panel to reveal an inflatable restraint module;

FIG. 2 is a plan view of the vehicle interior taken as indicated by line 2—2 of FIG. 1 showing an inflatable restraint module offset inboard of the right-side passenger and showing the cushion partially-broken-away to reveal the inboard and outboard tethers;

FIG. 3 is a front view of the cushion taken as indicated along line 3—3 of FIG. 1 and showing the cushion partially-broken-away to reveal the inboard and outboard tethers;

FIG. 4 is a view similar to FIG. 2, but showing an alternate embodiment of the invention in which the module is offset outboard of the right-side passenger;

DESCRIPTION OF THE PREFERRED EMBODIMENT

Figure 5:
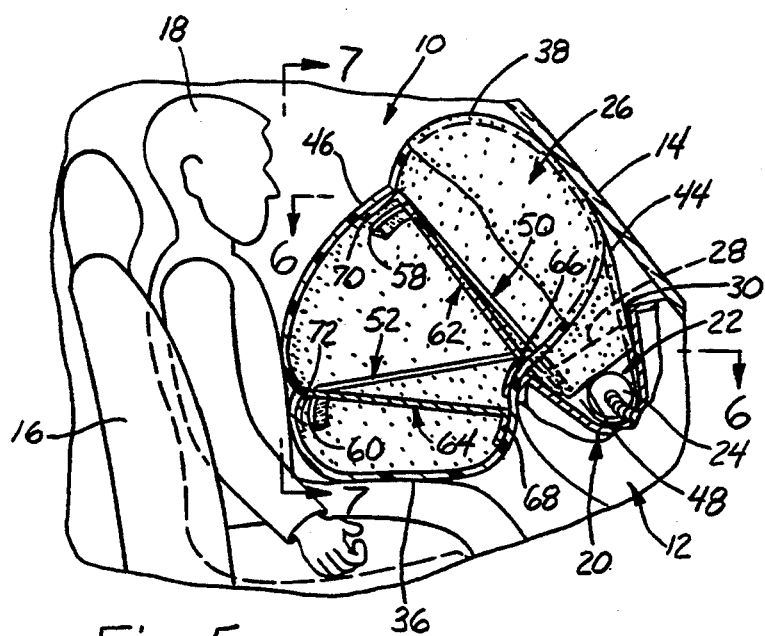
FIG. 5 is a view similar to FIG. 1, but showing another alternate embodiment of the invention.

Referring to FIG. 1, it is seen that a vehicle interior 10 for a left-drive vehicle includes an instrument panel assembly 12 mounted rearward of a windshield 14. The vehicle interior 10 includes an outboard front right-side passenger seat 16 located rearward of the instrument panel assembly 12. A front right-side passenger 18 is seated in an outboard front right-side passenger seating position.

An inflatable restraint system 20 for restraining the passenger 18 includes an inflatable restraint module 22 mounted to the vehicle body beneath a panel opening 30 in the instrument panel assembly 12. The module 22 houses a conventional inflator 24 and an inflatable restraint cushion 26 which is normally stored in a folded condition. The module 22 includes a module opening 28 which is aligned subjacent the panel opening 30. As is well-known, the inflator 24 is actuated in response to the vehicle experiencing a predetermined deceleration causing the inflator 24 to generate gas out through the module opening 28 to inflate the cushion 26 for deployment through the panel opening 30.

In accordance with the present invention, FIG. 2 best illustrates that the module opening 28 of the module 22 is laterally offset inboard of the passenger 18 such that the longitudinal centerline 32 of the module opening 28 of the module 22 is inboard of the longitudinal centerline 34 of the passenger seating position. Although it will be appreciated that a variety of lateral offsets may be used, testing has shown that the lateral offsets of up to 14 inches will provide restraint to the passenger 18.

Referring to FIGS. 1 and 2, the cushion includes a lower wall 36, an upper wall 38, right and left side walls 40, 42, a forward wall 44, and a rearward wall 46. The forward wall 44 includes a gas inlet 48 which is secured to a perimeter of the module opening 28 for operatively connecting the cushion 26 to the inflator 24. The walls, 36-46, are made of a conventional cushion material and may be integral with each other or formed separately and sewn or otherwise secured to each other. In the fully-inflated position, the forward wall 44 is adjacent the instrument panel assembly 12 and the rearward wall 46 is adjacent the passenger seat 16. The cushion 26 has an asymmetric shape such that the cushion 26 is laterally wider in the outboard direction than in the inboard direction relative the centerline 32 of the module opening 28 of the module 22.

Referring to FIGS. 1-3, an upper inboard tether 50 and a lower inboard tether 52 are both internal to the cushion 26 and extend diagonally from the forward wall 44 in the inboard direction to the rearward wall 46. The upper and lower inboard tethers 50, 52 have contiguous forward ends 54, 56 which are sewn or otherwise secured to the inside of the forward wall 44 of the cushion 26 outboard of the module 22. The upper and lower inboard tethers 50, 52 have rearward ends 58, 60, respectively, which are sewn or otherwise secured to the inside of the rearward wall 46 of the cushion 26 inboard of the forward ends 54, 56. In the fully extended position, the rearward end 58 of the upper inboard tether 50 is spaced vertically above the rearward end 60 of the lower inboard tether 52, as best shown in FIG. 1.

Referring to FIGS. 1-3, an upper outboard tether 62 and a lower outboard tether 64 are both internal to the cushion 26 and extend longitudinally between the forward wall 44 and the rearward wall 46. The upper and lower outboard tethers 62, 64 have forward ends 66, 68, respectively, sewn or otherwise secured to the inside of the forward wall 44 outboard of both the module opening 28 of the module 22 and the forward ends 54, 56 of the inboard tethers 50, 52. The upper and lower outboard tethers 62, 64 have rearward ends 70, 72, respectively, sewn or otherwise secured to the rearward wall 46 of the cushion 26 outboard of both the module opening 28 of the module 22 and the rearward ends 58, 60 of the inboard tethers 50, 52. In the fully extended position, the rearward end 70 of the upper outboard tether 62 is spaced vertically above the rearward end 72 of the lower outboard tether 64, as best shown in FIG. 1.

Referring to FIGS. 1-3, upon actuation the inflator 24 generates gas out through the module opening 28 in a rearwardly direction. The cushion 26 receives inflator gas through the gas inlet 48 of the forward wall 44 and inflates in a rearwardly direction so that initial inflation of the cushion 26 occurs inboard of the centerline 34 of the passenger seating position. During initial cushion 26 inflation, the diagonally extending upper and lower inboard tethers 50, 52 fully extend and provide a dual-directional force having both an outboard lateral force component A and a forward force component B which simultaneously act on the rearward wall 46 of the cushion 26, as shown in FIG. 2. The outboard lateral force A causes the inboard tethers 50, 52 to laterally steer further cushion 26 inflation in the outboard direction for positioning the cushion 26 in front of the passenger 18, while the forward force B limits cushion 26 inflation inboard of the centerline 34 of the passenger seating position and defines the spacing between the forward and rearward walls 44, 46 for shaping the cushion 26. As cushion 26 inflation continues, the upper and lower outboard tethers 62, 64 fully extend to position the cushion 26 in the outboard direction to further define the spacing between the forward and rearward walls 44, 46 of the cushion 26 for shaping the cushion 26.

As best shown in FIG. 2, the fully extended inboard tethers 50, 52 have a length which limits the rearward expansion of the rearward wall 46 of the cushion 26 relative the module opening 28 of the module 22 to a predetermined distance which is less than the rearward expansion of the rearward wall 46 which is permitted by the outboard tethers 62, 64. Consequently, the inboard tethers 50, 52 become fully extended and laterally steer the inflating cushion 26 in the outboard direction prior to full extension of the outboard tethers 62, 64. When the cushion 26 is fully-inflated, the inboard and outboard tethers 50, 52, 62, 64 also cooperatively maintain the cushion 26 in position for restraining the passenger 18 by preventing rotation of the fully-inflated cushion 26 towards the inboard direction.

Therefore, it will be appreciated that the diagonally extending inboard tethers 50, 52 have the surprising advantage of providing a dual-directional force which acts both laterally and forwardly, unlike prior art tether arrangements which only provide a unidirectional force in the forwardly direction. The inboard tethers 50, 52 enable the module opening 28 of the module 22 to be laterally offset since the inboard tethers 54, 52 laterally steer the inflating cushion 26 in front of the passenger 18. Furthermore, it will be appreciated that the module 22 and inflator 24 may be of a conventional design since the inboard tethers 50, 52 laterally steer the cushion 26 and eliminate the need for baffles or diffusers to redirect inflator 24 gas in the outboard direction towards the passenger 18. However, it will be understood that baffles or diffusers could be used if desired. It will further be appreciated that the cushion 26 has a lateral width in the outboard direction relative the centerline 32 of the module opening 28 of the module 22 sufficient to compensate for the lateral offset of the module opening 28 of the module 22 so that the fully-inflated cushion 26 extends in front of the passenger 18. Thus, it will be appreciated that the inflatable restraint system 20 with the module opening 28 of the module 22 being laterally offset from the centerline 34 of the passenger seating position provides restraint for the passenger 18 similar to the restraint provided by an inflatable restraint system with a module opening being substantially in front of the passenger seating position. Furthermore, it will be appreciated that the asymmetric cushion inherently provides restraint to an additional passenger seated inboard of the passenger seating position. In addition, the inflatable restraint system 20 provides flexibility in packaging the module 22 within the instrument panel assembly 12.

Thus, the present invention provides an improved inflatable restraint system 20 in which the module opening 28 of the module 22 is laterally offset so that initial cushion 26 inflation occurs inboard of the centerline 34 of the passenger seating position and in which the diagonally extending inboard tethers 50, 52 laterally steer the inflating cushion 26 outboard in front of the passenger 18 and in which the inboard and outboard tethers 50, 52, 62, 64 cooperatively position and shape the cushion 26 for restraining the passenger 18 seated in the passenger seating position.

FIG. 4 shows an alternate embodiment of this invention in which the module opening 28 of the module 22 is offset in the outboard direction from the centerline 34 of the passenger seating position. Offsetting the module opening 28 of the module 22 in the outboard direction may be desirable when there is space available to mount the module 22 outboard rather than inboard. It will be appreciated, that the embodiment shown in FIG. 4 has construction and function similar to the embodiment shown in FIGS. 1–3, and provides further flexibility in packaging the module 22 within the instrument panel assembly 12.

Figure 6:
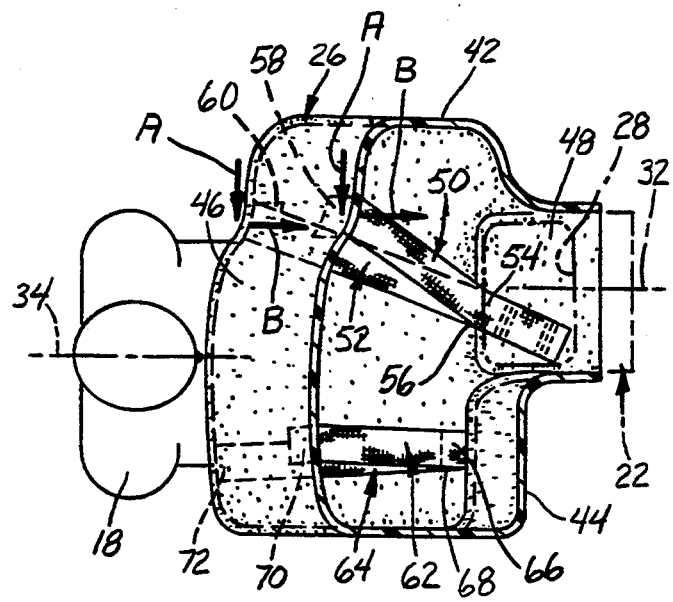
FIG. 6 is a view similar to FIG. 2 taken as indicated along line 6—6 of FIG. 5, and showing the alternate embodiment of FIG. 5.
Figure 7:
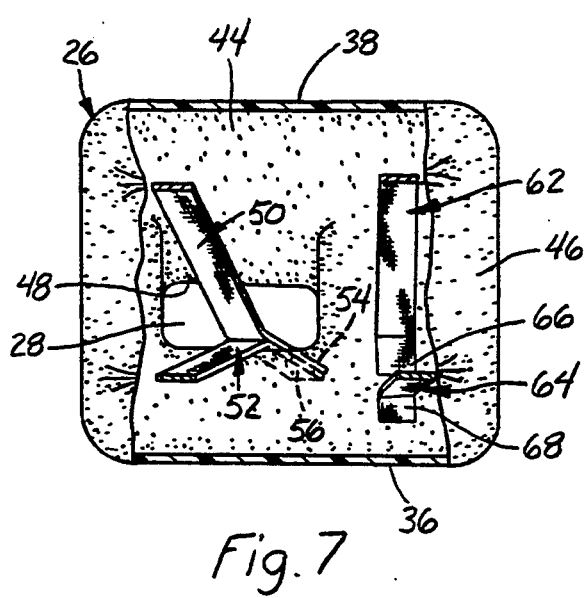
FIG. 7 is a view similar to FIG. 3 taken as indicated along line 7—7 of FIG. 5, and showing the alternate embodiment of FIG. 5.

FIGS. 5, 6, and 7 show another alternate embodiment of the invention in which the forward ends 54, 56 of the inboard tethers 50, 52 are secured to the inside of the gas inlet 48 of the forward wall 44 of the cushion 26 adjacent the module opening 28 of the module 22 and in which the forward end 68 of the lower outboard tether 64 is secured to the inside of the forward wall 44 of the cushion 26 and spaced below the forward end 66 of the upper outboard tether 62. It will be understood that the embodiment shown in FIGS. 5–7 functions similarly to the embodiment shown in FIGS. 1–3.

Thus, it will be appreciated that various inboard tether 50, 52 arrangements may be utilized as long as the rearward ends 58, 60 of the inboard tethers 50, 52 are secured inboard of the forward ends 54, 56 of the inboard tethers 50, 52 so that a lateral force A is provided which laterally steers the inflating cushion 26 in the outboard direction. Additionally, it will be appreciated that various outboard tether 62, 64 arrangements may be utilized as long as the outboard tethers 62, 64 are secured outboard of the module opening 28 of the module 22 to position the cushion 26 in front of the passenger 18.

It will be understood that a person skilled in the art may make modifications to the preferred embodiment shown herein within the scope and intent of the claims.

Although, the invention has been described for use with a right-side passenger 18 in a left-drive vehicle, it will be understood that the invention may also be utilized with a left-side passenger in a right-drive vehicle. Furthermore, it will be appreciated that the invention may be used for restraint of any vehicle passenger in which it is desirable to laterally offset the module and module opening from the centerline of the passenger seating position.

Although two inboard tethers 50, 52 and two outboard tethers 62, 64 are shown in the preferred embodiment, it will be understood that one each of the inboard and outboard tethers or more than two each of the inboard and outboard tethers may be provided.

While the present embodiment has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. In a vehicle body having a passenger seating position and having an inflatable restraint system including an inflatable restraint module mounted to the vehicle body, the module including a module opening through which an inflatable restraint cushion deploys, the module including an inflator for discharging gas out through the module opening to inflate the cushion, and the cushion including a forward wall and a rearward wall, the improvement comprising:

the longitudinal centerline of the module opening being offset in a lateral offset direction from the longitudinal centerline of the passenger seating position so that initial cushion inflation occurs offset of the centerline of the passenger seating position;

and a tether extending diagonally from the forward wall in the lateral offset direction to the rearward wall, the tether having a forward end secured to the inside of the forward wall of the cushion and a rearward end secured to the inside of the rearward wall of the cushion, the rearward end being spaced part in the lateral offset direction from the forward end such that the tether provides a lateral force to laterally steer further cushion inflation in a direction opposite the lateral offset direction and to provide a forward force to limit cushion inflation offset of the centerline of the passenger seating position and to define the spacing between the forward and rearward walls of the cushion;

whereby upon deployment of the cushion from the module, the tether positions and shapes the cushion for providing restraint to a passenger seated in the passenger seating position.

2. In a vehicle body having a passenger seating position and having an inflatable restraint system including an inflatable restraint module mounted to the vehicle body, the module including a module opening through which an inflatable restraint cushion deploys, the module including an inflator for discharging gas out through the module opening to inflate the cushion, and the cushion including a forward wall and a rearward wall, the improvement comprising:

the longitudinal centerline of the module opening being offset in a lateral offset direction from the longitudinal centerline of the passenger seating position so that initial cushion inflation occurs offset of the centerline of the passenger seating position;

a first tether means extending diagonally from the forward wall in the lateral offset direction to the rearward wall to provide a lateral force to laterally steer further cushion inflation in a direction opposite the lateral offset direction and to provide a forward force to limit cushion inflation offset of the centerline of the passenger seating position and to define the spacing between the forward and rearward walls of the cushion;

and a second tether means extending between the forward wall and the rearward wall of the cushion and laterally spaced apart from the module opening in the direction opposite the lateral offset direction to further define the spacing between the forward and rearward walls of the cushion;

whereby upon deployment of the cushion from the module, the first and second tether means cooperatively position and shape the cushion for providing restraint to a passenger seated in the passenger seating position.

3. The improvement of claim 2 further characterized by the first tether means comprising an upper strap and a lower strap.

4. The improvement of claim 3 further characterized by the upper and lower straps having forward ends secured to the inside of the forward wall of the cushion and having rearward ends secured to the inside of the rearward wall of the cushion, the rearward ends being spaced in the lateral offset direction from the forward ends.

5. The improvement of claim 4 further characterized by the rearward end of the upper strap being spaced vertically above the rearward end of the lower strap.

6. The improvement of claim 5 further characterized by the forward end of the upper strap being contiguous with the forward end of the lower strap.

7. In a vehicle body having an outboard right-side passenger seating position, and having an inflatable restraint system including a module mounted to the vehicle body, the module including a module opening through which an inflatable restraint cushion deploys, the module including an inflator for discharging gas out through the module opening to inflate the cushion, and the cushion including a forward wall and a rearward wall, the improvement comprising:

the longitudinal centerline of the module opening being offset inboard from the longitudinal centerline of the passenger seating position so that initial cushion inflation occurs inboard of the centerline of the passenger seating position;

an inboard tether means extending diagonally from the forward wall in the inboard direction to the rearward wall of the cushion to provide an outboard force to laterally steer further cushion inflation in the outboard direction and to provide a forward force to limit cushion inflation inboard of the centerline of the passenger seating position and to define the spacing between the forward and rearward walls of the cushion, an outboard tether means extending longitudinally between the forward wall and the rearward wall of the cushion and spaced outboard from the module to further define the spacing between the forward and rearward walls of the cushion, whereby upon deployment of the cushion from the module, the inboard and outboard tether means cooperatively position and shape the cushion for providing restraint to a passenger seated in the passenger seating position.

8. The improvement of claim 7 further characterized by the inboard tether means having a forward end secured to the inside of the forward wall of the cushion outboard of the module opening and having a rearward end secured to the inside of the rearward wall of the cushion inboard of the forward end.

9. The improvement of claim 8 further characterized by the outboard tether means having a forward end mounted on the forward wall of the cushion outboard of the module opening and a rearward end mounted on the rearward wall of the cushion outboard of the module opening.

10. The improvement of claim 7 further characterized by the inboard tether means having a forward end secured to the inside of the forward wall of the cushion adjacent the module opening and having a rearward end secured to the inside of the rearward wall of the cushion inboard of the forward end.

11. The improvement of claim 10 further characterized by the outboard tether means having a forward end mounted on the forward wall of the cushion outboard of the module opening and a rearward end mounted on the rearward wall of the cushion outboard of the module opening.

12. The improvement of claim 7 further characterized by the inboard tether means having a length which limits expansion of the rearward wall of the cushion relative the module to a predetermined distance which is less than the rearward expansion of the rearward wall of the cushion which is permitted by the outboard tether means so that the inboard tether means become fully extended and laterally steers the inflating cushion in the outboard direction prior to full extension of the outboard tether means.

13. The improvement of claim 7 further characterized by the cushion having an asymmetric shape such that the inflated cushion extends laterally further in the outboard direction than in the inboard direction relative the longitudinal centerline of the module opening.

* * * * *